United States Patent [11] 3,542,454

| [72] | Inventors | Edgard Hugues<br>Courbevoie;<br>Jean Soyer, Fontenay-aux-Roses, France |
|---|---|---|
| [21] | Appl. No. | 650,982 |
| [22] | Filed | July 3, 1967 |
| [45] | Patented | Nov. 24, 1970 |
| [73] | Assignee | Centre de Recherches et de Calculs<br>Optiques C.E.R.C.O.,<br>Bis, avenue du Chateau, Neuilly, France |
| [32] | Priority | Oct. 5, 1966 |
| [33] | | France |
| [31] | | No. 78,888 |

[54] WIDE ANGLE PHOTOGRAMMETRIC OBJECTIVE
1 Claim, 1 Drawing Fig.

[52] U.S. Cl................................................... 350/176,
350/210, 350/215
[51] Int. Cl....................................................... G02b 9/62
[50] Field of Search............................................. 350/215,
221, 210, 214, 220, 176

[56] References Cited
UNITED STATES PATENTS
| 3,209,649 | 10/1965 | Macher...................... | 350/220 |
| 2,481,639 | 9/1949 | Altman et al.................. | 350/215X |

*Primary Examiner*—David Schonberg
*Assistant Examiner*—Ronald J. Stern
*Attorney*—William D. Stokes ABSTRACT: Wide-angle objective comprising a front diverging lens unit, a back diverging lens unit, and a lens assembly disposed in between said front and back units. The lens assembly comprises two portions, and a diaphragm is disposed between these two portions thereby dividing the objective into a front and a back part. The objective is asymmetrical about the diaphragm, the front part of the objective having a focal length comprised between 0.6 F and 1.3 F where F is the focal length of the objective taken as a whole.

Patented Nov. 24, 1970 3,542,454
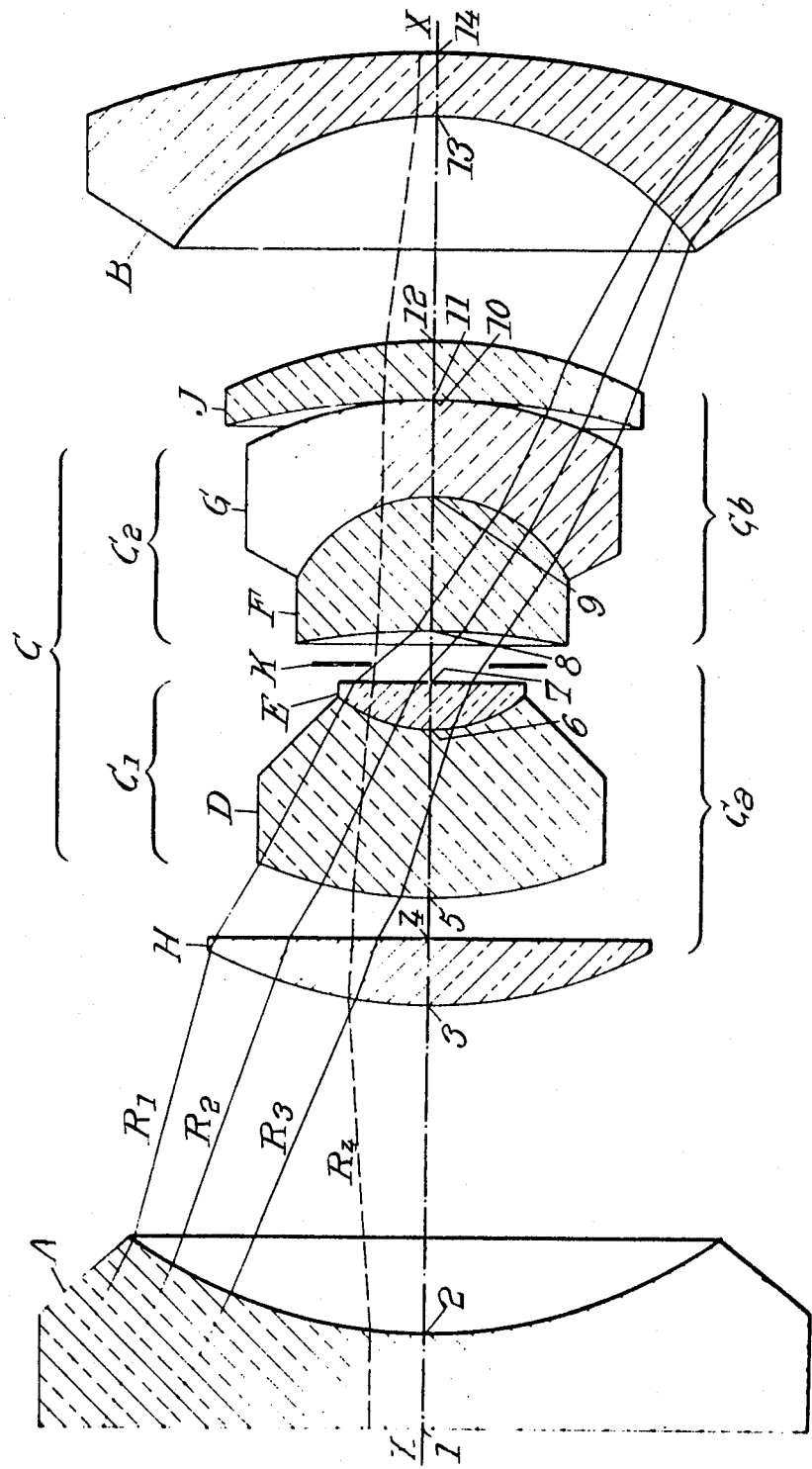

WIDE ANGLE PHOTOGRAMMETRIC OBJECTIVE

This invention relates to wide-angle objectives, in particular for photogrammetry or phototopography, and the invention is more especially concerned with objectives intended for taking aerial views.

More particularly still, the invention relates to wide-angle photogrammetric objectives of the type comprising, between two diverging lens units, a lens assembly (generally comprised of two units) there being a diaphragm disposed in this lens assembly (between the two units forming the lens assembly).

Such objectives having a ball between two divergent units have numerous advantages in photogrammetry, notably a wide angle of field. On the other hand, their aperture is often rather reduced, at least if it is wished to keep their distortions and aberrations small.

The chief object of the present invention is to provide an objective of this type having a relatively large aperture (for example from f: 5.6 to f: 4 and relatively small distortions and aberrations.

Prior to this invention, wide-angle objectives of this type were generally symmetrical about the diaphragm; the part of the objective in front of the diaphragm, and the part behind the diaphragm each had a focal length of approximately 2 F where F is the focal length of the objective taken as a whole.

In the present invention the objective is asymmetrical about the diaphragm; the focal length of the part of the objective in front of the diaphragm is comprised between 0.6 F and 1.3 F.

The wide-angle objective according to the present invention comprises a front diverging lens unit disposed on the optical axis of the objective, a back-diverging lens unit disposed on the optical axis behind said front-diverging unit, a lens assembly disposed on the optical axis between said front unit and said back unit said lens being divided into two portions disposed on the optical axis one in front of the other, and a diaphragm disposed between said two portions of said lens assembly, thereby dividing the objective into a front part in front of the diaphragm and a back part behind the diaphragm, the focal length of said front part being comprised between 0.6 F and 1.3 F where F is the focal length of the objective taken as a whole.

In a wide-angle objective according to the invention the back part of the objective (behind the diaphragm) can be in the form of a diverging lens system, as is the case in the specific example described later on with reference to the accompanying drawing, whereas in the prior art objectives this back part, being symmetrical with the front part, was always in the form of a converging lens system.

The first unit (near the object) of the objective comprises only a single diverging lens, and the front (towards the object) face of this single lens is formed by a plane or slightly concave (towards the exterior or front) surface.

Preferably the radius of curvature of this front face is at least 500 mm. (in the negative direction), this radius reaching infinity in the case where the front face is plane.

In a still more preferred embodiment of the invention, a separate converging lens is disposed in front of the lens assembly and preferably a separate converging lens is also disposed behind the lens assembly.

A preferred embodiment of the invention will now be described, merely by way of example, with reference to the accompanying drawing which shows an objective in axial section.

The objective shown in the drawing is an wide-angle objective specially intended for photogrammetry.

The objective comprises two diverging lens units A and B, each unit being formed by a single diverging lens A and B respectively, and between these two lens units A and B, a lens assembly C having appreciably the form of a truncated ball or sphere, this lens assembly C being formed by two lens units $C_1$ and $C_2$ (each of these two lens units $C_1$ and $C_2$ being for example formed by two lenses—D and E for $C_1$ and F and G for $C_2$—cemented together).

The front face 1 (towards the object) of the diverging lens A forming the first diverging unit (nearest the object) is formed by a plane or slightly concave (towards the exterior or front) surface. Preferably the radius of curvature of this face 1 is at least 500 mm. (in the negative direction), this radius reaching infinity in the case where the front face 1 is plane.

A separate converging lens H is disposed in front of lens assembly C and another separate converging lens J is disposed behind the lens assembly C; the lens assembly C and the converging lenses H and J thus together form a lens group.

Finally a diaphragm K is placed between the units $C_1$ and $C_2$.

Thus it can be seen that the wide-angle objective shown in the drawing comprises four lens units A, $C_a$ (formed by the lens H and the unit $C_1$), $C_b$ (formed by the unit $C_2$ and the lens J), and B. These four units comprise two converging units $C_a$ and $C_b$ disposed one on each side of the plane of the pupil in which the diaphragm K is placed, and two diverging units A and B, these latter two units each having the characteristic of being composed of only a single lens.

The lens A has, as indicated previously, a plane or slightly concave face at the front, the lens A being a plano-concave or biconcave lens. This lens has a rather high index of refraction, for example from 1.6 to 1.7, and a low Abbe number, for example between 30 and 50.

The unit $C_a$ is a positive group comprising three lenses H, D and E, the last two of which are cemented together, the isolated lens H increasing the aperture of the objective and having for this purpose a rather high index, for example, between 1.7 and 1.8.

The unit $C_b$ is also a positive unit comprising three lenses F, G and J, the first two of which are cemented together, the thickness of the cemented unit $C_2$ being approximately equal to that of the cemented unit $C_1$. The greater thickness of the lens F (with respect to the thickness of the lens E) permits the lateral chromatism to be corrected. It will be noted that the interval between the units $C_a$ and $C_b$ is sufficient to permit the diaphragm K to be placed in position.

Finally, the unit B is formed by a diverging meniscus of high index, for example from 1.6 to 1.8, which avoids the necessity of having too small a radius of curvature; its Abbe number is as high as possible, for example from 40—50.

This objective is asymmetrical about the diaphragm K, and the part in front of the diaphragm has a focal length smaller than the focal length of the objective taken as a whole, so that the part after the diaphragm is diverging.

The principal characteristics of the various lens units of the objective shown in the drawing will now be given, this objective having a focal length of 150 mm. an aperture of f: 5.6, and field of 90°:

1. Power in $10^{-3}$. mm.$^{-1}$:
   A: $-5.8 \pm 1$
   B: $-7.15 \pm 2$
   $C_a$: $9.65 \pm 1$
   $C_b$: $4.42 \pm 1$
2. Distances:
   From A to $C_a$: $71.87 \pm 15$ mm. (about 0.5 F).
   From $C_b$ to B: $51.36 \pm 10$ mm. (F/3).
   Between exterior faces 3 and 12 of the units.
   $C_a$ and $C_b$: about F, where F is the focal length.
3. The radii $r$ of the various faces 1 to 14 of the lenses, the distances $d$ between the successive faces, the indexes of refraction $n$ for the d-line of helium and the Abbé numbers of the various lenses, are given in the following table, in which the radii and the distances are indicated in mm:

| Lens | Face | Distance | Radius | Index for the d-ray | Abbé Number |
|---|---|---|---|---|---|
| A | 1 | 25.72 | −566.832 | 1.62025 | 36 |
|   | 2 | 71.87 | 138.541 | air |  |
| H | 3 | 15.72 | 111.494 | 1.80201 | 46 |
|   | 4 | 8.41 | 634.360 | air |  |
| D | 5 | 33.68 | 103.284 | 1.72467 | 38 |
|   | 6 | 11.00 | 37.220 |  |  |
| E | 7 | 11.88 | −26704.7 | 1.56997 | 57 |
|   | 8 | 36.16 | −126.212 | air |  |
| F | 9 | 17.19 | −37.269 | 1.51668 | 64 |
| G | 10 | 0.15 | −116.073 | 1.66678 | 33 |
|   | 11 | 13.06 | −239.603 | air |  |
| J | 12 | 51.36 | −94.137 | 1.80201 | 46 |
|   | 13 | 12.70 | −72.610 | air |  |
| B | 14 |  | −299.864 | 1.80201 | 46 |

This objective has an exact focal length of 153.343 mm. and a back focal length of 49,733 mm.

In the drawings the ray paths have been shown for the three oblique rays $R_1$, $R_2$ and $R_3$, the two extreme rays of which pass near the edges of the diaphragm K whereas the rays $R_2$ passes through the centre of the diaphragm, and for a ray $R_4$ parallel to the axis XX of the objective passing near the edge of the diaphragm.

An objective is thus obtained having a large field (90° and a relatively large aperture (f: 5.6 ) whose distorsion does not exceed 10 microns in the entire field ($1 \times 10^{-4}$ at 60° and $0.5 \times 10^{-4}$ at 90°).

The wave surfaces at the centre of the field, at the edge of the field and in the intermediate field at 60° practically do not exceed half of the wave length.

The objective does not have much vignetting.

The axial chromatism between the C- and e- lines does not exceed F/2000.

In the entire field the variation in size of the image according to the different radiations does not exceed $2 \times 10^{-4}$ in relative value.

This objective is relatively easy to manufacture, in particular since the front and back faces do not have much curvature.

In a general manner, while the above description discloses a preferred embodiment of the invention, it should be well understood that the invention is not limited thereto, and that there might be changes made without departing from the spirit and scope of the present invention.

We claim:

1. Wide-angle photogrammetric objective having a focal length of 153.343 mm. and a back focal length of 49.733 mm. consisting of six air-spaced lens units aligned along a common optical axis, said first unit A and said last unit B being single divergent lens elements, said second unit H and said fifth unit J being single convergent lens elements, said third and fourth units being cemented doublets consisting of lens elements D and E, and F and G, respectively said cemented doublets being separated by a diaphragm to the end that the objective is asymmetric about the diaphragm, the parameters of said lens elements having numerical values substantially as set forth in the following table wherein the "Face" numbers represent the optically active interfaces of said lens elements numbered consecutively from the object side to the image side, the "Distance" values represent the axial distance between interfaces, the "Radius" values represent the radius of curvature of the interface, and the "Index for the D-ray" and "Abbe number" represent the glass characteristics.

| Lens Element | Face | Distance (mm.) | Radius (mm.) | Index for the d-ray | Abbé Number |
|---|---|---|---|---|---|
| A | 1 | 25.72 | −566.832 | 1.62025 | 36 |
|   | 2 | 71.87 | 138.541 | air |  |
| H | 3 | 15.72 | 111.494 | 1.80201 | 46 |
|   | 4 | 8.41 | 634.360 | air |  |
| D | 5 | 33.68 | 103.284 | 1.72467 | 38 |
|   | 6 | 11.00 | 37.220 |  |  |
| E | 7 | 11.88 | −26704.7 | 1.56997 | 57 |
|   | 8 | 36.16 | −126.212 | air |  |
| F | 9 | 17.19 | −37.269 | 1.51668 | 64 |
| G | 10 | 0.15 | −116.073 | 1.66678 | 33 |
|   | 11 | 13.06 | −239.603 | air |  |
| J | 12 | 51.36 | −94.137 | 1.80201 | 46 |
|   | 13 | 12.70 | −72.610 | air |  |
| B | 14 |  | −299.864 | 1.80201 | 46 |